United States Patent
Wu et al.

(10) Patent No.: US 10,789,088 B2
(45) Date of Patent: Sep. 29, 2020

(54) PEER-TO-PEER LICENSE ENFORCEMENT IN VIRTUALIZED COMPUTING ENVIRONMENTS

(71) Applicant: VMware, Inc., Palo Alto, CA (US)

(72) Inventors: Junfei Wu, Beijing (CN); Yingfeng Ou, Beijing (CN); Dongyang Li, Beijing (CN); Xiaodong Ye, Beijing (CN); Xinzheng Wang, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 74 days.

(21) Appl. No.: 16/045,764

(22) Filed: Jul. 26, 2018

(65) Prior Publication Data

US 2020/0034172 A1   Jan. 30, 2020

(51) Int. Cl.
   *G06F 9/455*   (2018.01)
   *G06F 21/10*   (2013.01)
   *H04L 29/08*   (2006.01)

(52) U.S. Cl.
   CPC ........ *G06F 9/45558* (2013.01); *G06F 21/105* (2013.01); *H04L 67/104* (2013.01); *G06F 2009/45595* (2013.01); *G06F 2221/0768* (2013.01)

(58) Field of Classification Search
   CPC combination set(s) only.
   See application file for complete search history.

(56) References Cited

U.S. PATENT DOCUMENTS

| | | | |
|---|---|---|---|
| 9,354,928 B1 | 5/2016 | Buchheit | |
| 2007/0198427 A1* | 8/2007 | Vajjiravel | G06Q 30/06 705/59 |
| 2010/0299522 A1* | 11/2010 | Khambete | H04L 63/061 713/168 |
| 2011/0162062 A1* | 6/2011 | Kumar | G06F 21/10 726/15 |
| 2011/0243142 A1* | 10/2011 | Kwon | H04L 41/5041 370/400 |
| 2012/0278439 A1* | 11/2012 | Ahiska | H04L 67/2852 709/218 |
| 2013/0042003 A1* | 2/2013 | Franco | H04L 67/1097 709/226 |
| 2013/0326062 A1* | 12/2013 | Ryner | H04L 67/14 709/225 |
| 2014/0019959 A1* | 1/2014 | Dodgson | G06F 9/455 718/1 |
| 2014/0137261 A1* | 5/2014 | Chen | G06F 21/105 726/26 |

(Continued)

*Primary Examiner* — Dong U Kim
(74) *Attorney, Agent, or Firm* — Su IP Consulting

(57) ABSTRACT

An example method is provided for a first host running a client software to provision a virtual machine on the first host in a virtualized computing environment including one or more hosts. The method may include generating a license key message, transmitting the license key message to a second host via a peer-to-peer (P2P) network including the first host and the second host, receiving a determination of the second host whether the virtual machine can be provisioned on the first host via the P2P network, and deciding whether to provision the virtual machine on the first host based on the determination. Some example license key messages may include a license key and a seat number and a sharable level indicator associated with the license key.

20 Claims, 4 Drawing Sheets

(56) References Cited

U.S. PATENT DOCUMENTS

2016/0148142 A1* 5/2016 Palavalli .......... G06Q 10/06315
                                                        705/7.25
2017/0161470 A1* 6/2017 Feng ..................... G06F 21/105
2019/0005205 A1* 1/2019 Dargar .................. G06F 21/105

* cited by examiner

PEER-TO-PEER LICENSE ENFORCEMENT IN VIRTUALIZED COMPUTING ENVIRONMENTS

BACKGROUND

Unless otherwise indicated herein, the approaches described in this section are not admitted to be prior art by inclusion in this section.

Traditionally, information technology (IT) administrators have protected corporate data and applications and controlled costs by providing users with company-issued laptops or desktops and by defining how and from where the users could access corporate applications and data.

Virtualization allows the abstraction and pooling of hardware resources to support virtual machines for the users in a virtualized computing environment. For example, through virtualization, one or more virtual machines running one or more operating systems may be supported by the same physical machine (e.g., referred to as a "host"). Each virtual machine is generally provisioned with virtual resources to run an operating system and applications. The virtual resources may include virtual central processing unit (CPU) resources, virtual memory resources, virtual storage resources, virtual network resources, etc.

Today, IT administrators may create, secure, and manage local desktops for end users. End users may work within a virtual machine (e.g., VMware Horizon® FLEX™ virtual machine) on their local computers. End users may use a client module (e.g., embedded in VMware Fusion® Pro or VMware Workstation Player™) installed at their local computers to download the virtual machine from a policy-based server (e.g., VMware Horizon FLEX Policy Server). To activate the client module, a license key is generally required.

Once the local computers are installed with the client software with the license key, the policy-based server can assign one or more virtual machines to the local computers and also manage such virtual machines. However, the network constraints between the policy-based server and the local computers may render the management of the virtual machines inefficient.

DETAILED DESCRIPTION

Figure 1:
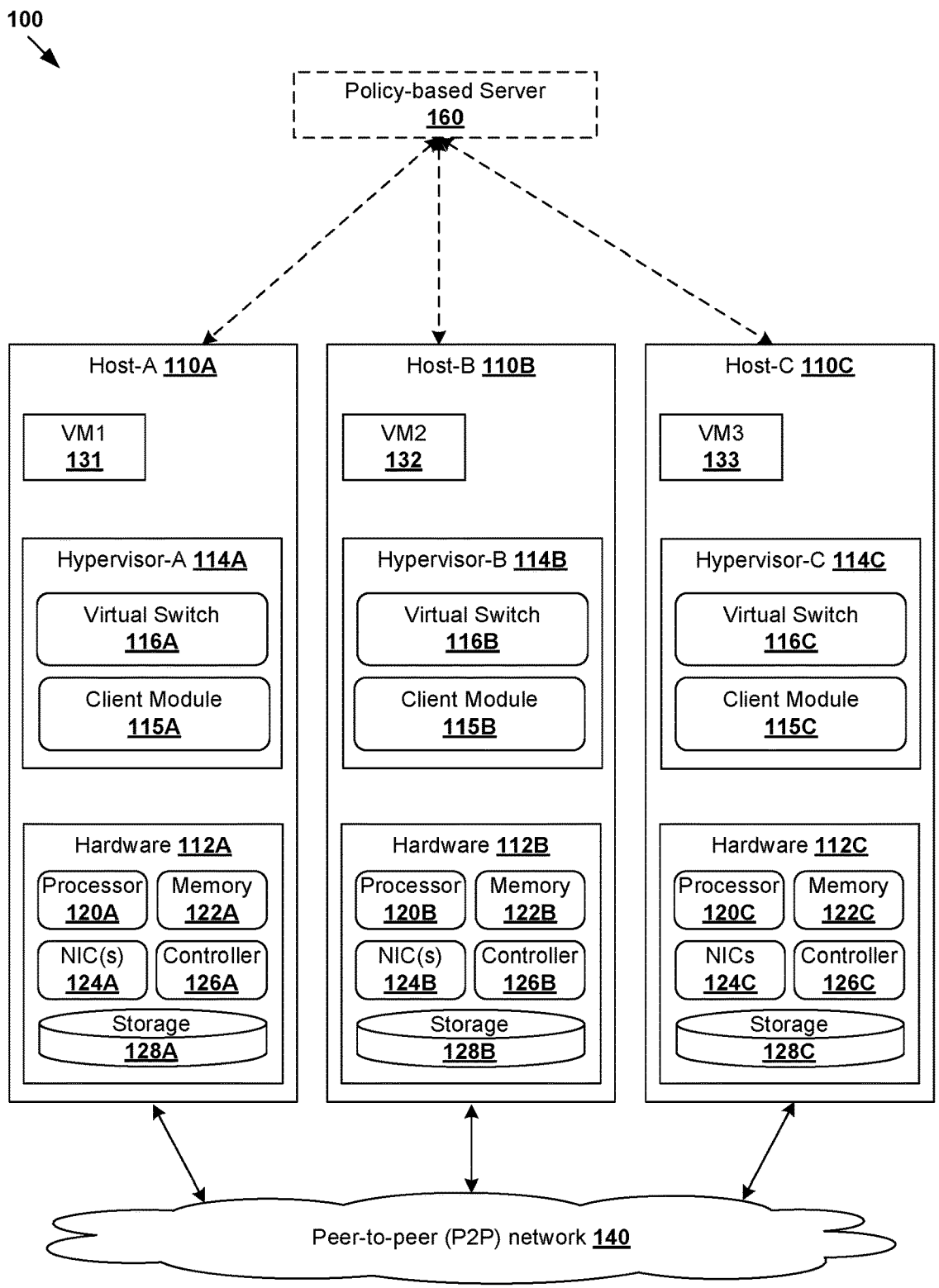
FIG. 1 is a schematic diagram illustrating an example virtualized computing environment in which license key messages are exchanged among hosts via a peer-to-peer (P2P) network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the drawings, can be arranged, substituted, combined, and designed in a wide variety of different configurations, all of which are explicitly contemplated herein.

In the disclosure, the term "seat" may refer to a client module (e.g., VMware Horizon® FLEX™ Client) that can be activated on a host. As discussed earlier, this activated client module can connect to the policy-based server to download one or more virtual machines. In response to having no available seat, a new client module cannot be activated on a host, and a new virtual machine cannot be downloaded to the host. Alternatively, "seat" may refer to a virtual machine assigned by a policy-based server to be provisioned on a host in a virtualized computing environment. In response to having no available seat, a new virtual machine cannot be provisioned in a virtualized computing environment. Typically, an enterprise may purchase a license key associated with a seat number from a licensor.

Challenges relating to manage virtual machines in a virtualized computing environment according to the license key will now be explained in more detail using FIG. 1, which is a schematic diagram illustrating example virtualized computing environment 100. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131; host-B 110B supports VM2 132; and host-C 110C supports VM3 133. In some embodiments, hypervisor-A 114A (e.g., VMware Fusion), hypervisor-B 114B (e.g., VMware Workstation Player) and hypervisor-C 114C (e.g., VMware Fusion) may run client module 115A, 115B and 115C, respectively, to establish communication with policy-based server 160 (e.g., VMware Horizon FLEX Policy Server) so that policy-based server 160 is configured to assign VM 131-133 to host-A 110A, host-B 110B and host-C 110C. VM1 131, VM2 132 and VM3 133 may be virtual machines (e.g., VMware Horizon FLEX virtual machines) having been downloaded from policy-based server 160 and are running locally on host-A 110A, host-B 110B and host-C 110C, respectively. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines 131-133, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. The term "hypervisor" may refer generally to a software layer or component that supports the execution of multiple virtualized computing instances, including system-level software that supports namespace containers such as Docker, etc.

Hypervisor 114A/114B/114C maintains a mapping between underlying hardware 112A/112B/112C and virtual resources allocated to respective virtual machines 131-133. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. For example, corresponding to hardware 112A/112B/112C, the virtual resources may include virtual CPU, virtual memory, virtual disk, virtual network interface controller (VNIC), etc. Hypervisor 114A/114B/114C further implements virtual switch 116A/116B/116C to handle egress packets from, and ingress packets to, respective virtual machines 131-133. The term "packet" may refer generally to a group of bits that can be transported together from a source to a destination, such as message, segment, datagram, etc.

In practice, policy-based server 160 may assign a virtual machine to a host running a hypervisor. In some embodiments, before policy-based server 160 assigns virtual machines in virtualized computing environment 100, hypervisor-A 114A, hypervisor-B 114B and hypervisor-C 114C are installed on host-A 110A, host-B 110B and host-C 110C, respectively. In some embodiments, hypervisors 114A, 114B and 114C need a license key to activate client modules 115A, 115B and 115C, respectively, so that policy-based server 160 may assign virtual machines on host-A 114A, host-B 114B and host-C 114C. After a virtual machine is assigned by policy-based server 160 and downloaded on any of host-A 114A, host-B 114B and host-C 114C, in some embodiments, the virtual machine is stored locally (e.g., at the host) for a complete desktop experience that does not require a network connection to policy-based server 160.

Conventionally, the license key is entered locally on hosts 110A, 110B and 110C, respectively. After client modules 115A, 115B and 115C are activated, policy-based server 160 may assign virtual machines to hosts 110A, 110B and 110C. Enforcing the seat number restrictions of a license key may sometimes be challenging. For example, since policy-based server 160 is usually located on a different network from the hosts 110A, 110B and 110C or may be unavailable, it may be inefficient to require policy-based server 160 to verify the seat number restrictions over a bandwidth-limited network connection each time that another virtual machine needs to be provisioned. For this reason, peer-to-peer license enforcement may be advantageous, as the peer hosts usually reside on the same intranet.

According to examples of the present disclosure, a license key message may be transmitted in peer-to-peer (P2P) network 140 among hosts 110A/110B/110C. In some embodiments, any host on P2P network 140 is configured to enforce the peer-to-peer license policy by (1) calculating a total seat number based on the license key message that it receives and (2) determining whether there is an available seat based on the calculated total seat number and instance running status messages that it receives from other hosts on P2P network 140. The details of the license key message and the instance running status message will be further described with various examples below.

Unlike a conventional license key that simply includes a series of letters and numbers for a hypervisor to activate a client module, according to examples of the present disclosure, a license key message transmitted via P2P network 140 includes, but not limited to, a license key, a seat number, a license sharable level information, and an universally unique identifier.

In some embodiments, the license key in the license key message generally includes a series of letters and numbers and is also associated with a specific seat number and specific license sharable level information. The license sharable level information refers to how the specific seat number associated with the license key can be continuously counted as a part of a total seat number in a virtualized computing environment (e.g., virtualized computing environment 100). For example, suppose a first host in a P2P network (e.g., P2P network 140) has a license key that is associated the license sharable level information being set to "false," and suppose the first host sends the license key to a second host on P2P network 140. The seat number received from the first host cannot be continuously counted as a part of a total seat number by the second host on P2P network 140, when the first host is offline from P2P network 140. On the other hand, if the license sharable level information is set to "true," then the seat number received from the first host can be continuously counted as a part of a total seat number by the second host on P2P network 140, regardless of whether the first host is online or offline from P2P network 140. In some embodiments, the first host running the client module being offline from P2P network 140 may be caused by the first host disconnecting from P2P network 140 or the client module on the first host stopping to run or crashing.

On the other hand, in response to the license sharable level information being set to be "true," the seat number received from the first host can be continuously counted as a part of a total seat number by any other hosts (e.g., the second host or the third host) on P2P network 140 regardless of whether the first host running the client module is offline from or remains online in P2P network 140.

In some embodiments, the universally unique identifier (UUID) may refer to a universally unique identifier associated with a host running the client module in P2P network 140 to ensure unambiguous identification of the host.

In addition to the license key message, an instance running status message may be also transmitted via P2P network 140 among hosts 110A/110B/110C. In some embodiments, the instance running status message includes, but not limited to, client module running information associated with a first host with a first UUID. As set forth above, the client module running information may be associated with whether the first host disconnects from P2P network 140 or whether the client module on the first host stops running or crashes.

In response to receiving the client module running information, a second host may store or update information locally at the second host. More specifically, the client module running information is associated with the license sharable level information and may impact the calculation of a total seat number.

Host Online Scenarios (Provision VM on Host-A 110A)

Figure 2:
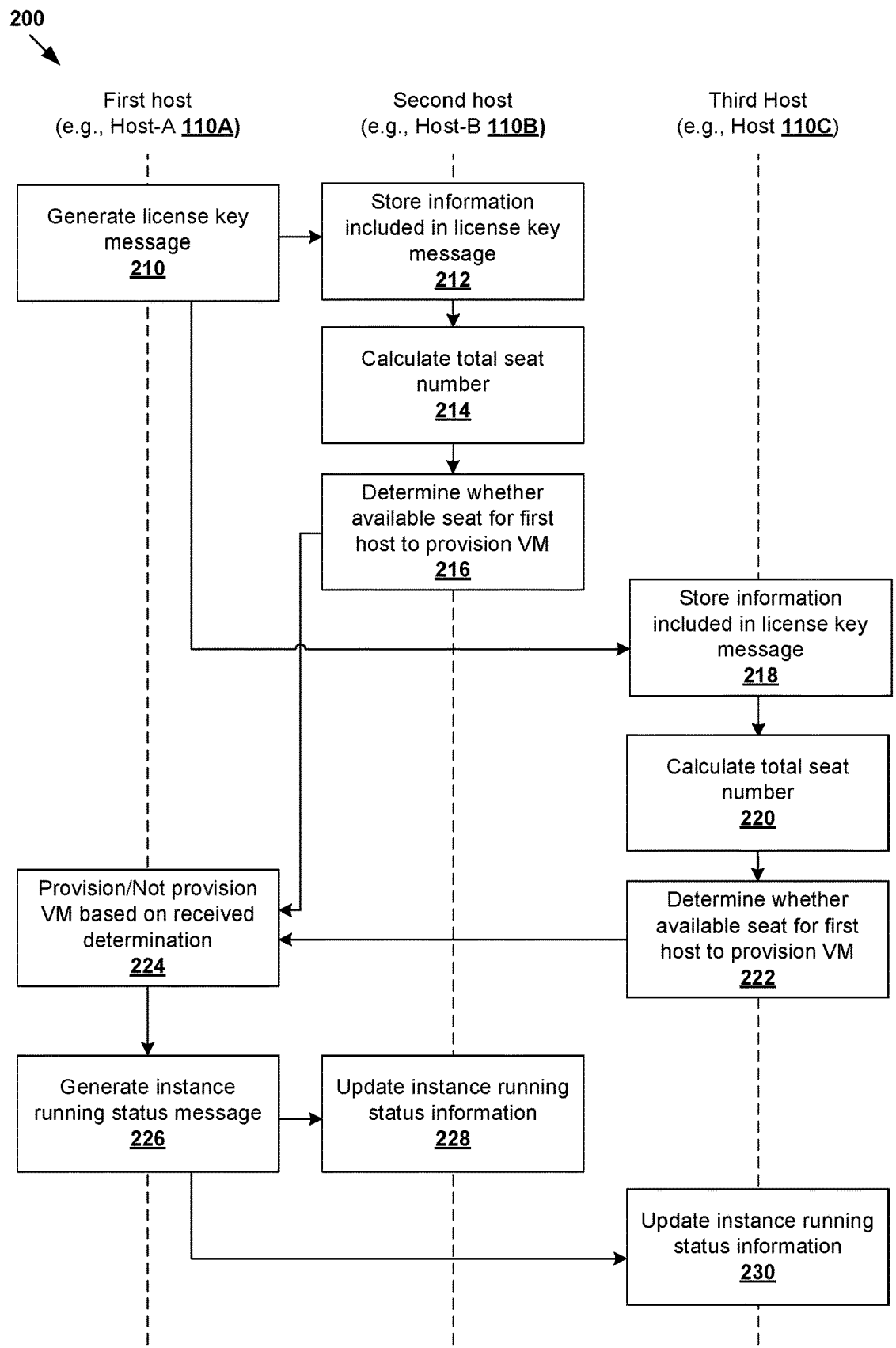
FIG. 2 is a flowchart of an example process for a second host and/or a third host to determine whether there is an available seat to provision a virtual machine in a virtualized computing environment.

In more detail, FIG. 2 is a flowchart of example process 200 for a second host and/or a third host to determine whether there is an available seat to provision a virtual machine in virtualized computing environment 100. In this example, all hosts are online and connected through P2P network 140. Example process 200 may include one or more operations, functions, or actions illustrated by one or more blocks, such as 210 to 230. The various blocks may be combined into fewer blocks, divided into additional blocks, and/or eliminated depending on the desired implementation. In practice, example process 200 may be implemented by any of host 110A/110B/110C. In the following, an example will be explained using host-A 110A as an example "first host"; host-B 110B as an example "second host" and host-C 110C as an example "third host."

At 210 in FIG. 2, in response to a request to provision a new virtual machine (e.g., VM1 131) on host-A 110A, host-A 110A generates a license key message. In some embodiments, host-A 110A has a license key "ABC," which may be entered by a user via the input device (e.g., keyboard, microphone, camera, barcode reader, etc.) of host-A 110A during the installation of hypervisor-A 114A on host-A 110A. In some embodiments, the license key "ABC" is associated with a specific seat number (e.g., 1 seat) and specific license sharable level information (e.g., true). Based on the license key, the seat number and the license sharable level information, host-A 110A may store the license key and the information associated with the license key in a state table at host-A 110A and generate a license key message according to the UUID of host-A 110A (e.g., UUID "123"), license key, seat number and license sharable level information stored in the state table. One example state table at host-A 110A is Table 1 shown below.

TABLE 1

| UUID | License Key | Seat Number | License Sharable Level |
|------|------------|-------------|------------------------|
| 123  | ABC        | 1           | True                   |

Assuming that host-B 110B initially does not have any license key. Without the license key, host-B 110B has neither the seat number information nor the license sharable level information. In some embodiments, host-B 110B may also locally maintain a state table similar to Table 1. In some embodiments, one example state table at host-B 110B is Table 2 shown below. The UUID "456" refers to the UUID of host-B 110B on P2P network 140. The other fields in Table 2 are left blank.

TABLE 2

| UUID | License Key | Seat Number | License Sharable Level |
|------|------------|-------------|------------------------|
| 456  |             |             |                        |

At 212 in FIG. 2, host-B 110B stores the information included in the license key message that it receives from host-A 110A in Table 2. In some embodiments, host-B 110B adds a row to store the information included in the license key message generated at 210. Accordingly, Table 2 may be updated in the following manner:

TABLE 2

| UUID | License Key | Seat Number | License Sharable Level |
|------|------------|-------------|------------------------|
| 456  |             |             |                        |
| 123  | ABC         | 1           | True                   |

At 214 in FIG. 2, host-B 110B calculates a total seat number based on the information stored in Table 2. Additional details on the calculation of the total seat number will be further described below and illustrated in FIG. 4.

In some embodiments, as shown in Table 2, with license key "ABC" and seat number "1," host-B 110B calculates 1 total seat number for one or more virtual machines to be provisioned in virtualized computing environment 100 based on license key "ABC". In some embodiments, the license sharable level information "true" refers to host-B 110B may continue to count the 1 seat associated with license key "ABC" even after host-A 110A running client module 115A is being offline from P2P network 140. The use of the license sharable level information will be further described below in details.

At 216 in FIG. 2, host-B 110B determines whether there is an available seat for the requested virtual machine (e.g., VM1 131) to be provisioned on host-A 110A. In some embodiments, the determination may be based on the total seat number calculated at 214 and instance running status messages that host-B 110B receives from other hosts on P2P network 140. As set forth above, the instance running status message is associated with one or more client modules running in virtualized computing environment 100. In some embodiments, in response to the total seat number calculated at 214 being greater than a number of client module running in virtualized computing environment 100, host-B 110B determines there is an available seat for host-A 110A to provision VM1 131 based on license key "ABC" and transmits the determination back to host-A 110A through P2P network 140. In response to the total seat number calculated at 214 being equal to or less than the number of client module running in virtualized computing environment 100, host-B 110B determines there is no available seat for host-A 110A to provision VM1 131 based on license key "ABC" and transmits the determination back to host-A 110A through P2P network 140.

At this stage in this example, host-B 110B has not received any instance running status message from other hosts, because none of the hosts on P2P network 140 has an activated module yet. Accordingly, because the total seat number "1" is greater than "0" client module running in virtualized computing environment 100, host-B 110B determines that there is an available seat based on license key "ABC" and sends the determination to host-A 110A.

At 224 in FIG. 2, host-A 110A may receive host-B 110B's determination that there is an available seat for host-A 110A. Host-A 110A may activate client module 115A to download a new virtual machine from policy-based server 160 based on license key "ABC."

Assuming host-C 110C has a license key "DEF," which may be entered by a user via the input device of host-C 110C during the installation of hypervisor-C 114C on host-C 110C. In some embodiments, the license key "DEF" is associated with a specific seat number (e.g., 10 seats) and specific license sharable level information (e.g., false). Based on the license key, the seat number and the license sharable level information, host-C 110C may store the license key and the information associated with the license key in a state table at host-C 110C. One example state table at host-C 110C is Table 3 shown below. The UUID "789" refers to the UUID of host-C 110C on P2P network 140.

TABLE 3

| UUID | License Key | Seat Number | License Sharable Level |
|------|-------------|-------------|------------------------|
| 789  | DEF         | 10          | False                  |

At 218 in FIG. 2, host-C 110C stores the information included in the license key message that it receives from host-A 110A in Table 3. In some embodiments, host-C 110C adds a row to store the information included in the license key message generated at 210. Accordingly, Table 3 may be updated as:

TABLE 3

| UUID | License Key | Seat Number | License Sharable Level |
|------|-------------|-------------|------------------------|
| 789  | DEF         | 10          | False                  |
| 123  | ABC         | 1           | True                   |

At 220 in FIG. 2, host-C 110C calculates a total seat number based on information stored in Table 3. As shown in Table 3, with license key "ABC" and seat number "1" and license key "DEF" and seat number "10," host-C 110C may aggregate the 10 seats and the 1 seat to obtain "11" total seat number. In some embodiments, the license sharable level information "true" associated with license key "ABC" refers to the 1 seat associated with the license key "ABC" may continuously be counted as a part of the total seat number even after host-A 110A running client module 115A is being offline from P2P network 140. On the other hand, the license sharable level information "false" associated with license key "DEF" refers to the 10 seats associated with the license key "DEF" cannot continuously be counted as a part of the total seat number after host-C 110C running client module 115C is offline from P2P network 140.

At 222 in FIG. 2, host-C 110C determines whether there is an available seat for the requested virtual machine (e.g., VM1 131) to be provisioned on host-A 110A. In some embodiments, the determination may be based on the total seat number calculated at 220 and an instance running status message that host-C 110C receives from other hosts on P2P network 140. As set forth above, the instance running status message is associated with one or more client modules on P2P network 140 being activated. In some embodiments, in response to the total seat number calculated at 220 being greater than a number of client module running in virtualized computing environment 100, host-C 110C determines there is an available seat for host-A 110A to provision VM1 131 and transmits the determination back to host-A 110A through P2P network 140. In response to the total seat number calculated at 220 being equal to or less than the number of client module running in virtualized computing environment 100, host-C 110C determines there is no available seat for host-A 110A to provision VM1 131 and transmits the determination back to host-A 110A through P2P network 140.

At this stage in this example, host-C 110C has not received any instance running status message from other hosts, because none of the hosts on P2P network 140 has an activated module yet. Accordingly, because the total seat number "11" is greater than "0" client module running in virtualized computing environment 100, host-C 110C determines that there is an available seat and send the determination to host-A 110A.

At 224 in FIG. 2, host-A 110A may receive host-C 110C's positive determination that there is an available seat for host-A 110A to provision VM1 131. Even though determinations made in 216 and 222 both indicate that there is available seat for host-A 110A to provision a new virtual machine (e.g., VM1 131), it should note that host-A 110A is configured to provision a new virtual machine in response to receiving at least one positive determination, even if determinations from other hosts are negative (i.e., no available seat to provision the new virtual machine on host-A 110A). In other words, if host-A 110A only receives negative determinations, then host-A 110A is configured to not provision a new virtual machine.

At 226 in FIG. 2, host-A 110A is configured to activate client module 115A and generate instance running status message accordingly. In some embodiments, the instance running status message includes client module 115A running information associated with host-A 110A. The instance running status message may be transmitted to host-B 110B and host-C 110C through P2P network 140, respectively. In some embodiments, host-A 110A is configured to update client module 115A running information. Therefore, Table 1 may be updated as:

TABLE 1

| UUID | License Key | Seat Number | License Sharable Level | Client Module Running |
|------|-------------|-------------|------------------------|------------------------|
| 123  | ABC         | 1           | True                   | Yes                    |

At 228 in FIG. 2, in response to receiving instance running status message from host-A 110A, host-B 110B is configured to update its state table. In some embodiments, host-B 110B is configured to record or update client module 115A running information associated with host-A 110A. Accordingly, Table 2 may be updated as:

TABLE 2

| UUID | License Key | Seat Number | License Sharable Level | Client Module Running |
|------|-------------|-------------|------------------------|------------------------|
| 456  |             |             |                        |                        |
| 123  | ABC         | 1           | True                   | Yes                    |

Similarly, at 230 in FIG. 2, in response to receiving instance running status message from host-A 110A, host-C 110C is configured to update its state table. In some embodiments, host-C 110C is configured to record or update client module 115A running information associated with host-A 110A. Accordingly, Table 3 may be updated to:

TABLE 3

| UUID | License Key | Seat Number | License Sharable Level | Client Module Running |
|------|-------------|-------------|------------------------|------------------------|
| 789  | DEF         | 10          | False                  |                        |
| 123  | ABC         | 1           | True                   | Yes                    |

In some embodiments, the client module running information is indicated "yes" when the host running the client module is online and connected to P2P network 140.

In some embodiments, the client module running information is indicated "no" when the host running the client module is offline from P2P network 140. In these embodiments, if the offline host is associated with a "false" license sharable level, the license key associated with the offline host and its associated seat number will not be used by other hosts on P2P network 140. Therefore, the seat number available in virtualized computing environment 100 may decrease.

Host Online Scenarios (Provision VM on Host-C 110C)

In some embodiments, similar to the steps set forth above for host-A 110A, to provision a virtual machine on host-C 110C, host-C 110C is configured to perform blocks 210, 224 and 226 in method 200. In response to host-C 110C performing blocks 210, 224 and 226, host-A 110A is configured to perform blocks 212, 214, 216 and 228 in method 200 and host-B 110B is configured to perform blocks 218, 220, 222 and 230 in method 200. For simplicity, these steps are not repeatedly described.

In response to receiving license key message generated by host-C 110C, host-A 110A is configured to store information included in the license key message in Table 1. In some embodiments, Table 1 may be updated to:

TABLE 1

| UUID | License Key | Seat Number | License Sharable Level | Client Module Running |
|------|-------------|-------------|------------------------|----------------------|
| 123  | ABC         | 1           | True                   | Yes                  |
| 789  | DEF         | 10          | False                  |                      |

According to Table 1, host-A 110A may calculate 11 total seat number for virtual machines to be provisioned in virtualized computing environment 100 and recognize that 1 client module (e.g., client module 115A) has been activated and is running in virtualized computing environment 100. Because 1 is less than 11, host-A 110A determines there is an available seat for host-C 110C to provision a new virtual machine (e.g., VM3 133) and transmits the determination back to host-C 110C via P2P network 140.

Similarly, in response to receiving license key message generated by host-C 110C, host-B 110B is configured to store information included in the license key message in Table 2. In some embodiments, Table 2 may be updated to:

TABLE 2

| UUID | License Key | Seat Number | License Sharable Level | Client Module Running |
|------|-------------|-------------|------------------------|----------------------|
| 456  |             |             |                        |                      |
| 123  | ABC         | 1           | True                   | Yes                  |
| 789  | DEF         | 10          | False                  |                      |

According to Table 2, host-B 110B may calculate 11 total seat number for virtual machines to be provisioned in virtualized computing environment 100 and recognize that 1 client module (e.g., client module 115A) has been activated and is running in virtualized computing environment 100. Because 1 is less than 10, host-B 110B determines there is an available seat for host-C 110C to provision a new virtual machine (e.g., VM3 133) and transmits the determination back to host-C 110C via P2P network 140.

As set forth above, in response to determinations received from host-A 110A and host-B 110B, host-C 110C is configured to activate client module 115C to download or provision a virtual machine from policy-based server 160 when client module 115C connects to policy-based server 160. In addition, host-C 110C is also configured to generate instance running status message, which includes client module 115C running information associated with host-C 110C. The instance running status message may be transmitted to host-A 110A and host-B 110B through P2P network 140. In some embodiments, host-A 110A, host-B 110B and host-C 110C are configured to update client module 115C running information. Therefore, Tables 1, 2 and 3 may be updated in the following manner:

TABLE 1

| UUID | License Key | Seat Number | License Sharable Level | Client Module Running |
|------|-------------|-------------|------------------------|----------------------|
| 123  | ABC         | 1           | True                   | Yes                  |
| 789  | DEF         | 10          | False                  | Yes                  |

TABLE 2

| UUID | License Key | Seat Number | License Sharable Level | Client Module Running |
|------|-------------|-------------|------------------------|----------------------|
| 456  |             |             |                        |                      |
| 123  | ABC         | 1           | True                   | Yes                  |
| 789  | DEF         | 10          | False                  | Yes                  |

TABLE 3

| UUID | License Key | Seat Number | License Sharable Level | Client Module Running |
|------|-------------|-------------|------------------------|----------------------|
| 789  | DEF         | 10          | False                  | Yes                  |
| 123  | ABC         | 1           | True                   | Yes                  |

Host Offline Scenarios

Figure 3:
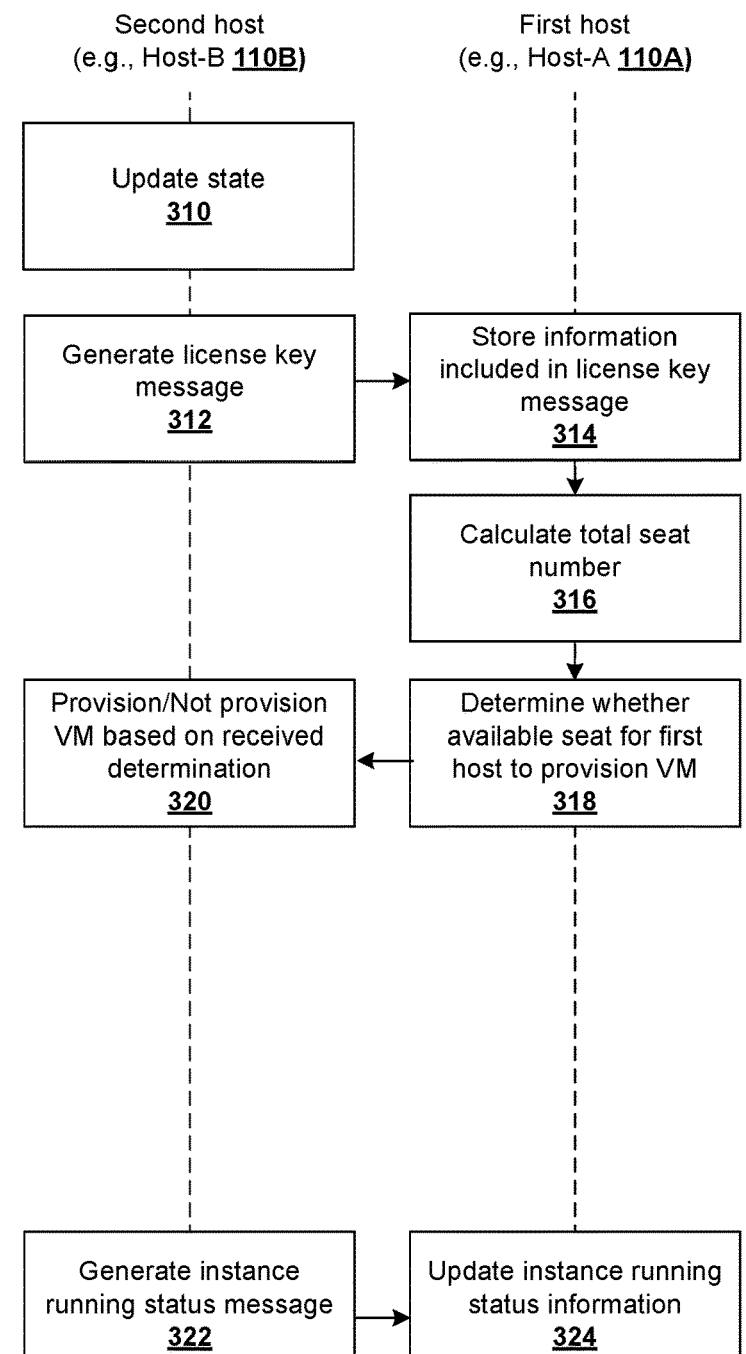
FIG. 3 is a flowchart of an example process for a second host to determine whether there is an available seat to provision a virtual machine in a virtualized computing environment in response to a third host running a client module being offline.

FIG. 3 is a flowchart of example process 300 for a first host to determine whether there is an available seat to provision a new virtual machine in virtualized computing environment 100 in response to a third host being offline from P2P network 140. Example process 300 may include one or more operations, functions, or actions illustrated by one or more blocks, such as 310 to 324. The various blocks may be combined into fewer blocks, divided into additional blocks, and/or eliminated depending on the desired implementation. In practice, example process 300 may be implemented by host-A 110A and host-B 110B.

At 310 in FIG. 3, host-B 110B updates Table 2 at host-B 110B in response to host-C 110C running client module 115C being offline from P2P network 140. In response, an example Table 2 may be updated in the following manner:

TABLE 2

| UUID | License Key | Seat Number | License Sharable Level | Client Module Running |
|------|-------------|-------------|------------------------|----------------------|
| 456  |             |             |                        |                      |
| 123  | ABC         | 1           | True                   | Yes                  |
| 789  | DEF         | 10          | False                  | No                   |

Similarly, Table 1 may be updated as:

TABLE 1

| UUID | License Key | Seat Number | License Sharable Level | Client Module Running |
|---|---|---|---|---|
| 123 | ABC | 1 | True | Yes |
| 789 | DEF | 10 | False | No |

At 312 in FIG. 3, in response to a request to provision a new virtual machine on host-B 110B (e.g., VM2 132), host-B 110B generates a license key message according to information in Table 2 above. The license key message may include a first license key "ABC" with 1 seat and a second license key "DEF" with 10 seats. In addition, first license key "ABC" is associated with "true" license sharable level and "yes" client module running information (i.e., host-A 110A running client module 115A is being online on and connected to P2P network 140). Similarly, second license key "DEF" is associated with "false" license sharable level and "no" client module running information (i.e., host-C 110C running client module 115C is being offline from P2P network 140).

At 314 in FIG. 3, host-A 110A stores and/or updates the information included in the license key message that it receives from host-B 110B in Table 1. Accordingly, Table 1 may be:

TABLE 1

| UUID | License Key | Seat Number | License Sharable Level | Client Module Running |
|---|---|---|---|---|
| 123 | ABC | 1 | True | Yes |
| 789 | DEF | 10 | False | No |
| 456 | | | | |

At 316 in FIG. 3, host-A 110A calculates a total seat number based on information stored in Table 2. As shown in Table 2, with license key "ABC" and seat number information "1," host-A 110A calculates 11 total seat number for virtual machines provisioned in virtualized computing environment 100. However, the 10 total seat number associated with license key "DEF" cannot be continuously counted as a part of the total seat number by other hosts (e.g., host-A 110A) anymore because of the associated license sharable level "false" as set forth above.

At 318 in FIG. 3, host-A 110A determines whether there is an available seat for host-B 110C to provision a new virtual machine (e.g., VM2 132) on host-B 110B. In some embodiments, in response to the 1 seat calculated at 316 being equal to the 1 client module (e.g., client module 115A) running in virtualized computing environment 100, host-A 110A determines there is no seat for the new virtual machine to be provisioned on host-B 110B and transmits the determination back to host-B 110B through P2P network 140.

At 320 in FIG. 3, host-B 110B may receive determination from host-A 110A that there is no available seat for host-B 110B to provision any new virtual machine. In some embodiments, because host-C 110C is being offline from P2P network 140, host-B 110B can only receive determination from host-A 110A. In response to none determination received by host-B 110B can support provision of the new virtual machine, host-B 110B does not activate client module 115B to provision a new virtual machine.

At 322 in FIG. 2, host-B 110B is configured to generate instance running status message. The instance running status message may be transmitted to host-A 110A through P2P network 140. Similarly, at 324 in FIG. 3, host-A 110A is configured to update instance running status information based on received instance running status message. Therefore, Table 1 may be:

TABLE 1

| UUID | License Key | Seat Number | License Sharable Level | Client Module Running |
|---|---|---|---|---|
| 123 | ABC | 1 | True | Yes |
| 789 | DEF | 10 | False | No |
| 456 | | | | No |

Figure 4:
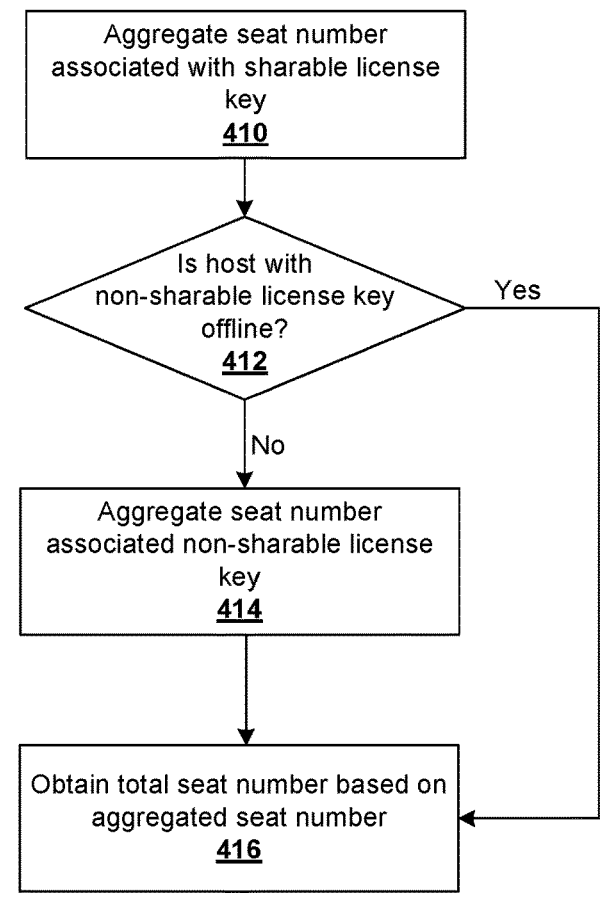
FIG. 4 is a flowchart of an example process of a host that receives one or more license key messages and is configured to calculate a seat number.

FIG. 4 is a flowchart of an example process 400 of a host that receives one or more license key messages and is configured to calculate a seat number. Example process 400 may include one or more operations, functions, or actions illustrated by one or more blocks, such as 410 to 416. The various blocks may be combined into fewer blocks, divided into additional blocks, and/or eliminated depending on the desired implementation. In practice, example process 400 may be implemented by any of host 110A/110B/110C.

At 410 in FIG. 4, the host (e.g., host-B 110B in FIG. 2) aggregates a number of seats supported by different license keys with "true" license sharable level received from the other one or more hosts on a P2P network (e.g., P2P network 140). As set forth above, the seat number associated with the license key received from the other one or more hosts can be continuously counted as a part of the total seat number regardless of whether the one or more hosts are offline from or remain online in the P2P network.

At 412 in FIG. 4, the host determines whether the other one or more hosts running the client modules having license keys with the "false" license sharable level are offline from P2P network 140. As set forth above, the seat numbers associated with the license keys that have "false" license sharable level cannot be counted as a part of the total seat number when the other hosts are offline from P2P network 140. If all the other one or more hosts are indeed offline from P2P network 140, block 412 may be followed by block 416, in which the host obtains a total seat number in virtualized computing environment 100 based on the number of seats aggregated in 410.

On the other hand, when the other host remains online on P2P network 140, even if the license keys have "false" license sharable levels, the seat numbers associated with the license keys can still be continuously counted in virtualized computing environment 100. Therefore, for any of the other one or more hosts that remain on P2P network 140, block 412 may be followed by block 414, in which the host aggregates the number of seats computed in block 410 with the number of seats supported by the license keys from such hosts even with "false" license sharable level.

Block 414 may be followed by block 416. At 416 in FIG. 4, the host obtains a total seat number in virtualized computing environment 100 based on the number of seats aggregated in 414.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may also include input/output devices, such as a keyboard, mouse, microphone, speakers, cameras, display devices, barcode readers, card readers, etc. The computer system may include a non-transitory computer-readable medium having stored thereon instructions or program code that, when executed by the processor, cause the processor to perform processes described herein with reference to FIG. 2 to FIG. 4. For example, a computer system may be deployed in virtualized computing environment 100 to perform the functionality of host 110A/110B/110C.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host running a client software to provision a virtual machine on the first host in a virtualized computing environment including one or more hosts, comprising:
   generating, by the first host, a license key message to include a license key, a seat number corresponding to a number of virtual machines to be provisioned based on the license key and a sharable level indicator of the license key;
   transmitting, by the first host, the license key message to a second host via a peer-to-peer (P2P) network including the first host and the second host;
   receiving, by the first host, a determination of the second host whether the virtual machine can be provisioned on the first host via the P2P network; and
   deciding, by the first host, whether to provision the virtual machine on the first host based on the determination.

2. The method of claim 1, wherein the license key is received at the first host via an input device of the first host or is received from other hosts in the virtualized computing environment via the P2P network.

3. The method of claim 1, wherein the sharable level indicator of the license key refers to whether the seat number can be counted as a part of a total seat number by the one or more hosts in the P2P network after the first host is offline from the P2P network.

4. The method of claim 1, wherein the method further comprises transmitting an online or offline status associated with the first host and a client module configured to run on the first host to the second host via the P2P network.

5. A method for a second host running a client software to determine whether a virtual machine is provisioned on a first host in a virtualized computing environment including one or more hosts, comprising:
   receiving a first license key message;
   extracting information associated with a first license key, a first seat number corresponding to a number of virtual machines to be provisioned based on the first license key and a first sharable level indicator of the first license key from the first license key message;
   locally storing the extracted information associated with the first license key message;
   calculating a total seat number based on the first seat number and the first sharable level indicator;
   determining whether the virtual machine is provisioned on the first host based on an available seat associated with the total seat number; and
   transmitting the determination to the first host via a P2P network including the first host, the second host and the one or more hosts, wherein the first sharable level indicator refers to that the first seat number can be counted as a part of the total seat number after the first host is offline from the P2P network.

6. The method of claim 5, wherein the method further comprises receiving an online or offline status associated with the first host and a client module that is running on the first host via the P2P network.

7. The method of claim 5, wherein the method further comprises:
   receiving a second license key message from a third host;
   extracting information associated with a second license key, a second seat number corresponding to a number of virtual machines to be provisioned based on the second license key and a second sharable level indicator of the second license key from the second license key message; and locally storing the extracted information associated with the second license key message.

8. The method of claim 7, wherein:
the second sharable level indicator refers to that the second seat number can be counted as a part of the total seat number after the third host is offline from the P2P network; and
the calculating the total seat number further comprises aggregating the first seat number and the second seat number.

9. The method of claim 7, wherein:
the third host is online on the P2P network;
the second sharable level indicator refers to that the second seat number cannot be counted as a part of the total seat number after the third host is offline from the P2P network; and
the calculating the total seat number further comprises aggregating the first seat number and the second seat number.

10. The method of claim 7, wherein:
the third host is being offline from the P2P network;
the second sharable level indicator refers to that the second seat number cannot be counted as a part of the total seat number after the third host is offline from the P2P network; and
the calculating the total seat number is based on the first seat number but not based on the second seat number.

11. A non-transitory computer-readable storage medium that includes a set of instructions which, in response to execution by a processor of a first host, cause the processor to perform a method for the first host running a client software to provision a virtual machine on the first host in a virtualized computing environment including one or more hosts, wherein the method comprises:
generating, by the first host, a license key message to include a license key, a seat number corresponding to a number of virtual machines to be provisioned based on the license key and a sharable level indicator of the license key;
transmitting, by the first host, the license key message to a second host via a peer-to-peer (P2P) network including the first host and the second host;
receiving, by the first host, a determination of the second host whether the virtual machine can be provisioned on the first host via the P2P network; and
deciding, by the first host, whether to provision the virtual machine on the first host based on the determination.

12. The non-transitory computer-readable storage medium of claim 11 wherein the license key is received at the first host via an input device of the first host or is received from other hosts in the virtualized computing environment via the P2P network.

13. The non-transitory computer-readable storage medium of claim 11, wherein the sharable level indicator of the license key refers to whether the seat number can be counted as a part of a total seat number by the one or more hosts in the P2P network after the first host is offline from the P2P network.

14. The non-transitory computer-readable storage medium of claim 11, wherein the method further comprises transmitting an online or offline status associated with the first host and a client module configured to run on the first host to the second host via the P2P network.

15. A non-transitory computer-readable storage medium that includes a set of instructions which, in response to execution by a processor of a second host running a client software, cause the processor to determine whether a virtual machine is provisioned on a first host in a virtualized computing environment including one or more hosts, wherein the method comprises:
receiving a first license key message;
extracting information associated with a first license key, a first seat number corresponding to a number of virtual machines to be provisioned based on the first license key and a first sharable level indicator of the first license key from the first license key message;
locally storing the extracted information associated with the first license key message;
calculating a total seat number based on the first seat number and the first sharable level indicator;
determining whether the virtual machine is provisioned on the first host based on an available seat associated with the total seat number; and
transmitting the determination to the first host via a P2P network including the first host, the second host and the one or more hosts, wherein the first sharable level indicator refers to that the first seat number can be counted as a part of the total seat number after the first host is offline from the P2P network.

16. The non-transitory computer-readable storage medium of claim 15, wherein the method further comprises receiving an online or offline status associated with the first host and a client module that is running on the first host via the P2P network.

17. The non-transitory computer-readable storage medium of claim 15, wherein the method further comprises:
receiving a second license key message from a third host;
extracting information associated with a second license key, a second seat number corresponding to a number of virtual machines to be provisioned based on the second license key and a second sharable level indicator of the second license key from the second license key message; and
locally storing the extracted information associated with the second license key message.

18. The non-transitory computer-readable storage medium of claim 17, wherein:
the third host is online on the P2P network;
the second sharable level indicator refers to that the second seat number cannot be counted as a part of the total seat number after the third host is offline from the P2P network; and
the calculating the total seat number further comprises aggregating the first seat number and the second seat number.

19. The non-transitory computer-readable storage medium of claim 17, wherein:
the third host is online on the P2P network;
the second sharable level indicator refers to that the second seat number cannot be counted as a part of the total seat number after the third host is offline from the P2P network; and
the calculating the total seat number further comprises aggregating the first seat number and the second seat number.

20. The non-transitory computer-readable storage medium of claim 17, wherein:
  the third host is being offline from the P2P network;
  the second sharable level indicator refers to that the second seat number cannot be counted as a part of the total seat number after the third host is offline from the P2P network; and
  the calculating the total seat number is based on the first seat number but not based on the second seat number.

* * * * *